TAPE LOCKING DEVICE

Filed Oct. 31, 1968

INVENTOR
DARRELL W. ZIELKE
BY Cullen, Sloman, & Cantor
ATTORNEYS

United States Patent Office 3,523,654
Patented Aug. 11, 1970

3,523,654
TAPE LOCKING DEVICE

Darrell W. Zielke, Madison Heights, Mich., assignor to Stereodyne, Inc., Troy, Mich., a corporation of Michigan Filed Oct. 31, 1968, Ser. No. 772,314
Int. Cl. B65h 75/28
U.S. Cl. 242—74.1 1 Claim

ABSTRACT OF THE DISCLOSURE

A tape anchoring plug is molded integrally with the body of the hub, and connected thereto by a narrow neck having a controlled line of fracture. Pressure on the plug at assembly first anchors the tape, then severs the plug and guides it into an indentation in the hub where it permanently clamps the tape to the hub.

BACKGROUND OF INVENTION

In the magnetic tape cassette art, where the tape hubs are only about one inch in diameter, the small size of the components makes the anchoring of the tape to the hub on a production line basis extremely difficult. In the past, the tape anchoring element has generally been a separate piece, not initially connected to the hub. Being quite tiny, the handling and proper orientation and guiding of this element during assembly has required complex and precision jigs. Furthermore, such prior designs have not provided adequate anchoring force to resist the high tape pull-out loads encountered. It is the object of this invention to eliminate these and other prior art problems.

DETAILED DESCRIPTION OF THE INVENTIION

Figure 1:
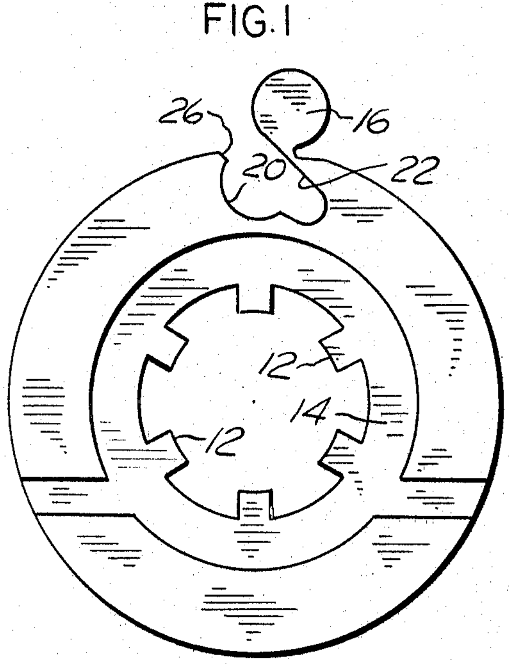
FIG. 1 is a plan view of an annular hub provided with the integrally formed anchoring means of this invention.

Referring now to FIG. 1 of the drawings, there is illustrated on a scale of about four times actual size a typical hub upon which is wound magnetic tape such as is used in cassettes for small portable tape recorders. Annular hub 10 is provided with internal splines 12 which are engaged by a driving spindle in the recorder/player mechanism to cause the tape to be transported past the transducer head and between the pair of hubs in the cassette. The hub is further provided with a recessed portion 14 for a purpose not material to the invention herein.

Figure 2:
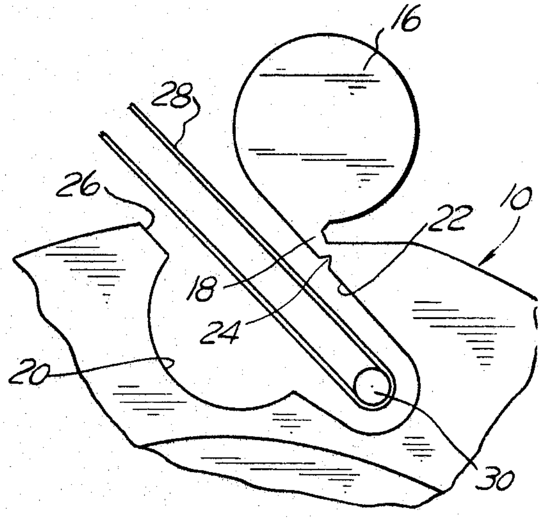
FIG. 2 is an enlarged view of the anchoring means portion of the hub of FIG. 1, and further showing the first step of anchoring a piece of tape to the hub.

At one point on the periphery of the hub is a locking plug 16 integrally formed with the hub and connected thereto by neck 18 (best shown in FIG. 2). The hub is preferably molded from an acetal type plastic such as "Delrin" or "Celcon."

Adjacent locking plug 16 is a circular indentation or opening 20 passing entirely through the edge of the hub. The diameter of circular indentation 20 is preferably substantially indentical to that of locking plug 16. In practice, locking plug 16 has been built to a diameter of .125" plus or minus .001", while the radius of indentation 20 has been made .062" plus or minus .001". An extension 22 of circular indentation 20 angles off from its lower right hand side.

As best shown in FIG. 2, locking plug neck 18 is specifically contoured to have a pre-weakened axis to provide a line of controlled fracture. To further assure proper positioning of the fracture line, the underside of neck 18 has a weakening notch 24 which creates a high stress point as will be understood by those skilled in the art.

At the side of circular indentation 20 opposite from neck 18 is a beveled shoulder 26 for a purpose to be described below.

Figures 3, 4:
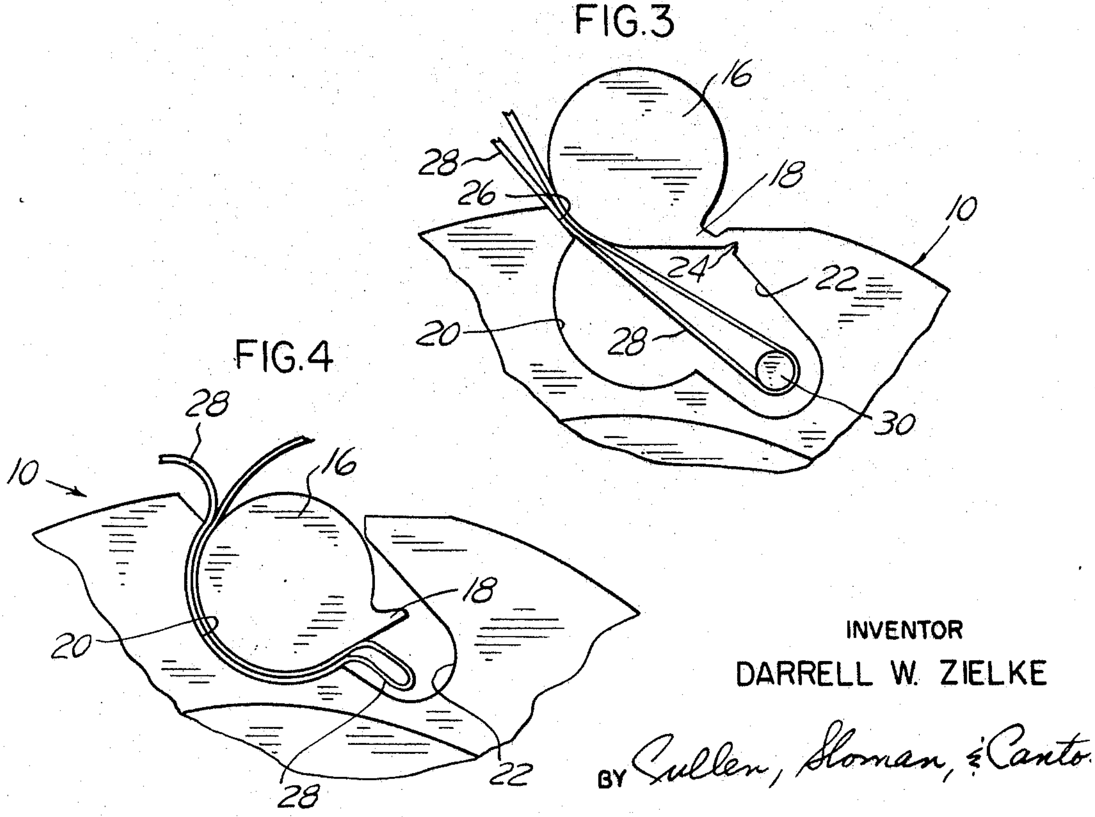
FIG. 3 is a view similar to FIG. 2, but showing the second step of the tape anchoring operation.
FIG. 4 is a view similar to FIGS. 2 and 3, but showing the tape as finally anchored to the hub.

The assembly and anchoring of the tape to the hub will now be described. Hub 10 is first placed in a fixture which grips it and holds it against movement. Next, the inner end of a piece of tape 28 is doubled over a transverse pin 30, and the pin is machine guided into the extension portion 22 of circular indentation 20, as shown in FIG. 2. Pin 30 is merely a temporary expedient to guide and position the tape during the anchoring operation. Next, a finger (not illustrated) on the assembly machine cams locking plug 16 downwardly and at a slight angle to the left toward circular indentation 20. The combination of the contour of neck 18 and the physical properties of the selected plastic material assures that neck 18 will be capable of deflecting under this force and acting as a hinge, without premature fracture, to permit locking plug 16 to pivot about the neck until it contacts opposite shoulder 26 of the hub, as shown in FIG. 3. Tape 28 is thus clamped between locking plug 16 and shoulder 26, and cannot slip out or shift axially relative to hub 10 during the remainder of the assembly operation. This is essential, since the tape must be properly registered with the rim of the hub, with no overhang.

Continued downward pressure on locking plug 16 after engagement with shoulder 26 causes fracture across the neck starting at notch 24, thus severing plug 16 from the main portion of hub 10. The span of the mouth of indentation 20 from notch 24 to the nearest point on shoulder 26 is approximately .020" less than the diameter of locking plug 16. Therefore, the mouth of circular indentation 20 must be sprung apart slightly in order to permit entry of locking plug 16. This is achieved by further downward pressure on locking plug 16, until it finally settles snugly in place, as shown in FIG. 4. After the maximum dimension of plug 16 passes through the mouth of indentation 20, the mouth springs resiliently back to its previous condition, thus preventing withdrawal of plug 16 and gripping plug 16 firmly to prevent any shifting thereof. In other words, plug 16 is permanently squeezed or pressed downwardly against tape 28 to clamp it in place. At this time, transverse pin 30 is removed axially, its function being no longer needed.

It will be seen from the forgoing description that the unique anchoring means of this invention is a considerable improvement over the prior art. First, no separate anchoring means need be gripped, oriented and guided into place. The integral locking plug of this invention need only be cammed. Secondly, the controlled hinging action and fracture assures that the tape will be anchored prior to severing of the plug. Finally, the configuration of the plug and plug-receiving indentation provides a wedging action which is capable of resisting extremely high tape pull-out loads without failure of the anchor. In fact, the tape will fail in tension before the anchor fails.

This invention may be further developed within the scope of the following claim. Accordingly, the above specification is to be interpreted as illustrative of only a single operative embodiment of this invention, rather than in a strictly limited sense.

I now claim:

1. Anchoring means for permanently securing the inner end of a tape to an annular hub upon which the tape is spirally wound, wherein the hub is fabricated of a rigid brittle molded plastic having some degree of resilience comprising:

an opening at one point on the peripheral edge of the hub, said opening including a mouth portion at the point at which the opening intersects the hub peripheral edge, and a broader inner portion extending from said mouth portion radially inwardly into the body of the hub annulus;

a locking plug, comprising a body portion and a narrow neck portion, formed integrally with the hub and projecting radially outwardly from the hub peripheral edge and joined thereto by said neck at a point immediately adjacent a first edge of said opening mouth, said locking plug body portion being so contoured and dimensioned as to be substantially identical with the size and shape of said hub opening, said locking plug neck portion being provided with a predetermined locally weakened fracture point;

whereby radially inward pressure on said locking plug body portion causes said locking plug to pivot about said neck portion towards said hub opening, with said locking plug neck portion acting as a hinge until said locking plug body contacts the second edge of said opening mouth opposite from said first edge, whereupon continued pressure on said locking plug causes a controlled fracture at said locking plug fracture point, permitting said locking plug to enter said hub opening, the dimensions of said plug causing said opening to be momentarily and resiliently spread apart under such pressure to permit entry of said locking plug, said mouth of said opening thereafter resiliently returning to its original position thereby to snugly lock said plug in said opening.

References Cited

UNITED STATES PATENTS

| | | | |
|---|---|---|---|
| 1,368,415 | 2/1921 | Tanner | 242—74.2 |
| 3,195,828 | 7/1965 | Kuckhoff et al. | 242—74.1 |
| 3,326,483 | 6/1967 | Ivans | 242—74 X |

NATHAN LOUIS MINTZ, Primary Examiner